United States Patent [19]
Carino

[11] 3,904,939
[45] Sept. 9, 1975

[54] CAPACITOR CASE SEAL AND VENTING MEANS

[75] Inventor: John W. Carino, Columbia, S.C.

[73] Assignee: General Electric Company, Hudson Falls, N.Y.

[22] Filed: Feb. 11, 1974

[21] Appl. No.: 441,052

[52] U.S. Cl. .............. 317/230; 174/52 S; 220/44 R
[51] Int. Cl.² ........................................... H01G 9/00
[58] Field of Search ............... 317/230; 174/52 S; 220/44 R

[56] References Cited
UNITED STATES PATENTS

| | | |
|---|---|---|
| 2,881,368 | 4/1959 | Hancock ............................ 317/230 |
| 3,197,547 | 7/1965 | Peace et al. ........................ 317/230 |
| 3,435,301 | 3/1969 | Oehme ............................... 317/230 |
| 3,680,203 | 8/1972 | Braiman et al. ................... 317/230 |

Primary Examiner—Andrew J. James

[57] ABSTRACT

An electrolytic capacitor comprising an open-ended casing, said casing having an inner wall with means defining a channel; and a resilient seal member compressibly supported in the channel to form a hermetic seal for the open end of the casing. Venting means can be provided by forming the channel with a gradually varying depth such that excess gas pressure can be vented by causing the seal to be tipped out of the channel at the shallowest point of the channel.

5 Claims, 3 Drawing Figures

PATENTED SEP 9 1975  3,904,939

3,904,939

CAPACITOR CASE SEAL AND VENTING MEANS

BACKGROUND OF THE INVENTION

This invention relates to seal constructions and more particularly to a seal construction for fluid-containing electrical devices such as electrolytic capacitors.

Heretofore some electrolytic capacitor hermetic seals have been held in the open end juxtaposed against an annular shoulder formed in the inner wall of an open end of an insulative cylindrical casing by a cylindrical, metal, outer retaining ring. The ring is flexed inwardly of the casing to apply, by wedging action, force to the outer face of a disc-shaped seal, thereby to bias the seal inwardly against an annular shoulder. However, certain capacitor designs do not allow the use of the conductive metal ring due to application requirements.

In order to seal capacitors for these applications, it has been necessary to (1) cement the inner face of the seal to the annular shoulder as a means for temporarily fixing the seal in place for subsequent application and curing of an epoxy fillet; (2) install a metal retaining ring against the outer face of the seal until the cement is ultimately cured; (3) remove the metal ring; and (4) manually introduce a sealing fillet of epoxy around the outer perimeter of the seal adjacent and in contact with the inner casing wall to provide a permanent seal therebetween.

Another variant on the foregoing method is to provide a plurality of splines which are molded to the inner wall of the casing in a perpendicular relationship to the annular shoulder. The seal, upon insertion, will be wedged in place with the cylindrical wall of the disc-shaped seal engaging the splines and outer perimeter of the inner face of the seal contacting the annular shoulder. The epoxy fillet is then applied and cured as in (4) above to complete the seal.

Accordingly, it is an object of this invention to provide an improved seal construction for electrical devices such as electrolytic capacitors which can be simply sealed in an economical one-step operation.

It is another object of this invention to provide a simple and effective venting mechanism which can be provided for in the design of the molded casing inner wall. Other objects of this invention will be apparent from the following description and accompanying claims.

SUMMARY OF THE INVENTION

In accordance with the aforementioned objects, one embodiment of this invention is an electrolytic capacitor comprising an open-ended, molded thermoplastic casing, the inner wall of which has means formed thereon defining a channel; and a resilient seal hermetically compressibly supported in said channel.

Another embodiment of this invention provides an electrolytic capacitor differing from said one embodiment in that the channel has a gradually varying depth, thereby allowing the seal to vent at the shallowest point of the channel.

This invention will be better understood by reference to the following description taken in conjunction with the accompanying drawings.

DESCRIPTION OF THE PREFERRED EMBODIMENTS

Figure 1:
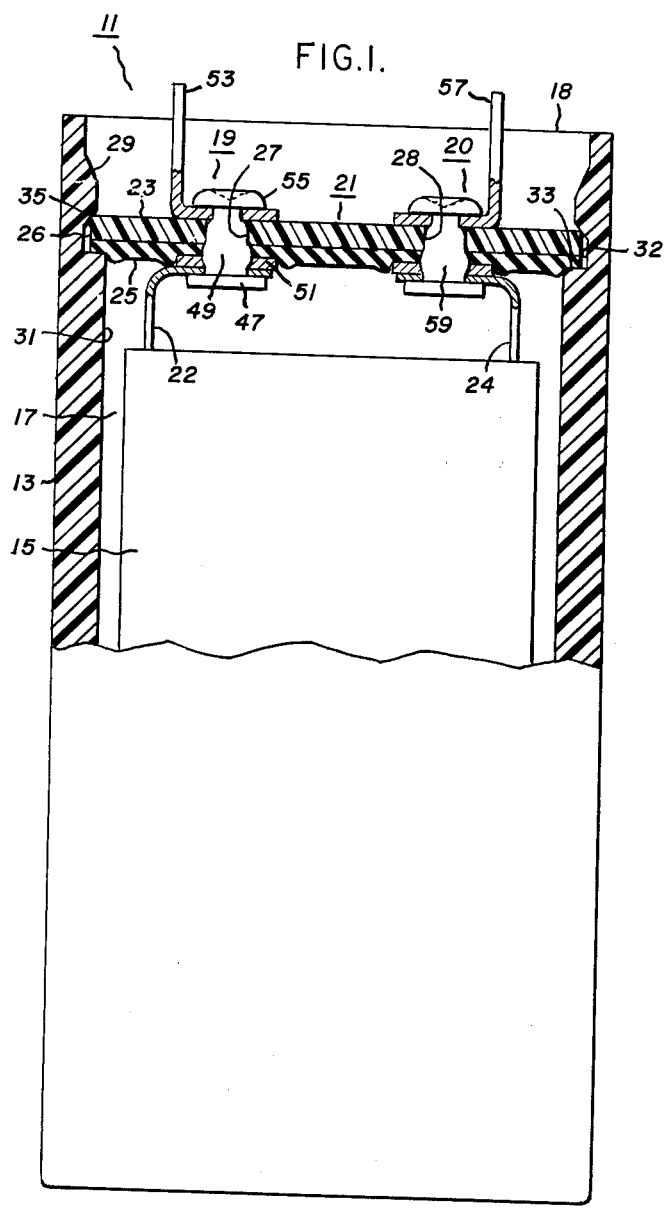
FIG. 1 is an axial section of one embodiment of an electrolytic capacitor in accordance with this invention.

Referring now to FIG. 1, an electrolytic capacitor 11 is shown comprising a cup-shaped, phenolic thermoset plastic casing 13 containing a rolled capacitor section 15 conventionally made up of a pair of convolutely wound electrode foils (not shown) of film forming metal such as aluminum or other capacitor electrode metals well known in the art. The foils are separated by paper or other dielectric spacer material (not shown). Capacitor section 15, when disposed in the casing 13, is impregnated with a liquid electrolyte which may be of any conventional or known type of capacitor electrolyte as, for example, an aqueous ammonium pentaborate-glycol solution or a non-aqueous organic liquid composition or mixture. The electrolyte may be of a liquid, gel, paste, or other form. Typically, the capacitor section 15 is impregnated with electrolyte prior to insertion into the casing 13. However, some applications utilize an excess of electrolyte in the casing.

Preferably, the casing 13 is cup-shaped with one open end, as in FIG. 1, which is hermetically sealed by a seal assembly constructed in accordance with the invention. It should be understood that the seal structures described hereinbelow could be employed in types of capacitors other than those shown. For example, the casing 13 could be open at both ends and have one or both ends hermetically sealed in accordance with the invention herein. As has been stated, in accordance with the preferred embodiment, the casing is preferably constructed of a molded phenolic thermoset plastic; however, as will be apparent to those skilled in the art, other thermoset or thermoplastic materials may be substituted therefor.

A seal 21 is provided to hermetically seal the open end 18 of the cup-shaped casing 13. In sealing the open end 18, the two areas of special concern are, of course, the area around terminal assemblies 19, 20 and the interface between the inner wall 31 and the cylindrical side wall 26 of the seal 21; the improvement of the seal of the latter, fully described hereinbelow, being the primary object of the invention herein. The terminal assembly 19 comprises a rivet 47 having a rivet shank 49 inserted through opening 27, a tab 22 connected at one end to capacitor section 15 and at the outer end mounted over rivet shank 49, a washer 51 mounted on rivet shank 49 adjacent the tab 22, and a first terminal 53 mounted between the seal 21 and a flattened end 55 of rivet shank 49. Terminal assembly 20 is constructed in an analogous manner to that of assembly 19 to provide electrical connection of the capacitor section 15 to a second terminal 57 via a tab 24 and a rivet 59. It will be understood by those skilled in the art that other terminal constructions will also provide satisfactory operation.

The seal 21 is preferably of an electrically non-conductive material and usually comprises a laminated assembly of different materials. For example, seal 21 includes an outer, relatively rigid, paper base, phenolic resin 23 and an inner layer 25 of a suitable elastomeric cold flow-resistant material such as Neoprene and Buna N rubber.

Also, suitable normally sealed venting means (not shown) may be provided in the seal 21 which will burst or vent upon the development of a predetermined amount of pressure within the capacitor. The venting means may comprise a centrally located cylindrical recess in the seal 21 formed by a conventional means such as by cutting out a plug portion of the layer 23, thereby to leave only a predetermined thickness of the inner layer 25. This thickness is thus dimensioned to vent by rupturing at the predetermined pressure.

The seal assembly 21 is hermetically supported on the inner wall 30 inwardly of the opening 18 in a channel 32 defined between an annular rib 29 and an annular shoulder 33 formed in the inner wall 30. The width of the channel 32 is chosen relative to the thickness of the seal 21 so as to provide approximately a 30% compression of the resilient layer 25 when the seal is positioned between the rib 29 and shoulder 33. Because diameter of the seal 21 is less than the diameter of the channel 32, the compressional forces on the seal 21 are applied between a plurality of points 35, spaced from the bottom wall of channel 32 on the inner side of rib 29 and the shoulder 33. In a typical capacitor casing construction and as an example, the approximate dimensions would be: 1,869 mils diameter of the seal 21; 100 mils total uncompressed thickness of seal 21; 27 mils noncompressed thickness of elastomeric layer 25; 19 mils compressed thickness of layer 25; 73 mils thickness for layer 23; 1,875 mils diameter of channel 32; and 80 mils width of channel 32 measured between the shoulder 33 and the points of contact 35 of the seal 21 on the inner side of seal 21.

It will be apparent to those skilled in the art that the degree of compression can be varied in accordance with the sealing requirement of the particular application and with the characteristics of the material selected for layer 25.

In the sealing operation, the seal 21 is inserted in the opening 18 so as to bring the resilient layer 25 into engagement with the shoulder 33. Sufficient force is applied to the seal 21 to flex and push it past the rib 29 to allow the outer edge of layer 23 to catch beneath the innermost side of the rib 29. After passing the peak of rib 29, the seal will spring back in an essentially planar configuration. The seal 21, being smaller in diameter than the diameter of channel 32, will tend to center itself within the channel with approximately equal compressive forces being applied around the entire perimeter of seal 21 between the inner side of rib 29 (at points 35) and the shoulder 33.

This construction thus provides a hermetic seal for the opening 18 — in one step — by simply snapping or press-fitting the seal 21 into place beneath the rib 29, thereby to eliminate the need to provide the conventional metallic retaining ring, the outer layer of epoxy or other similar expedients which were required in the prior art to hold a seal or cover assembly in hermetically sealing engagement with the casing inner wall. The simplicity and ease of this construction, thereby reducing cost, will be readily apparent to those skilled in the art.

The casing 13 can be molded by any conventional molding technique such as compression, injection, or transfer molding. Because the casing can be molded with the rib 29 and edge 33, the need to provide additional sealing steps required with metal cans, such as rolling over of the open end of the can, forming a bead in the can wall, or other conventional sealing steps, is eliminated.

Figure 2:
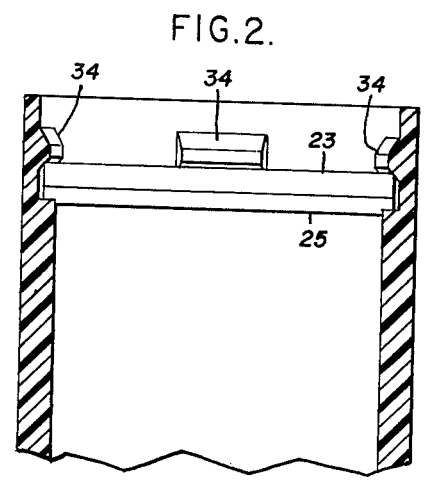
FIG. 2 is an axial section of an electrolytic capacitor casing of another embodiment of this invention.

Referring now to FIG. 2, an alternate construction for the annular rib 29 is shown. This embodiment differs from that shown in FIG. 1 only in the contrasting structures of the rib 34 (FIG. 2) and the rib 29 (FIG. 1). The remaining parts of the capacitor have not been shown in FIG. 2 for clarity in view of the fact that they are identical with that shown in FIG. 1. As will be apparent, the rib must be constructed such that it will provide a fluid-tight compression of the rubber layer 25 against the shoulder 33. Accordingly, it will be clear to those skilled in the art that the rib 34 may be in sections or in any other expedient shape (such as, for example, hemispherical projections) for maintaining compression of the rubber layer.

Figure 3:
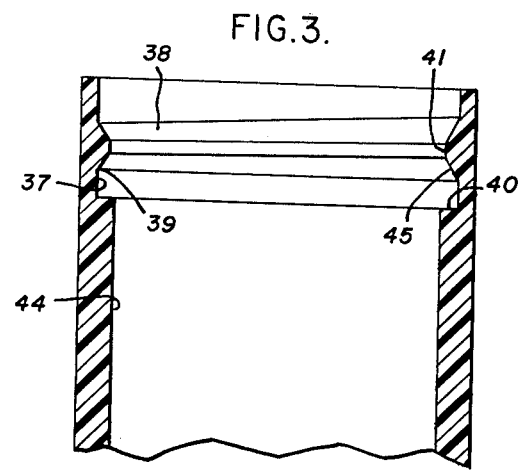
FIG. 3 is an axial section of still another embodiment of an electrolytic capacitor casing in accordance with this invention.

Referring now to FIG. 3, there is shown still another embodiment of this invention which differs from that of FIG. 1 only in the contrasting structures of the ribs 38 (FIG. 3) and the rib 29 (FIG. 1). Again, the remaining parts of the capacitor have not been illustrated in FIG. 3, they being the same as that shown in FIG. 1. The inner casing wall of the embodiment of FIG. 3 is molded to allow a seal positioned therein to be displaced from a hermetic engagement with the wall to allow excess gas pressure to be vented. The venting is provided by forming in an inner casing wall 44 a channel 37 having a gradually varying depth. The length of a rib inner side 45 is linearly increased from a minimum point 39 to a maximum point 41 (180° offset from point 39), while slope of the rib inner side 45 and the channel width remain constant. Accordingly, the channel 37 is dimensioned to provide approximately uniform compressional forces on a seal placed therein, thereby to provide an approximate compression of 30% as in the foregoing embodiments. This construction will allow a seal (not shown) of substantially uniform thickness, when positioned in the channel 37, to tip up and out of the channel 37 at the point of minimum depth 39, while it is still retained within the channel 37 at the point 41 of maximum depth. The points 39, 41 of minimum and maximum depth, respectively, are determined by the length of inner side 45. The varying depth construction of channel 37 allows the seal 21 to vent excess gas pressure without expelling the entire seal 21 and capacitor section 15. Otherwise, the seal and channel structure for this embodiment are preferably constructed as described hereinbefore in reference to FIGS. 1 and 2 except the venting recess (not shown) is now unnecessary and, therefore, omitted.

Although the invention has been described principally with respect to electrolytic capacitors, it will be evident that the seal structure of the invention herein may have application in other electrical devices where maintenance of a strong but simple fluid-tight seal for the container of the electrical device is important.

Further, while the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. An electrical capacitor comprising:
   a. a molded, thermoplastic cylindrical casing having an opening defined by an inner wall, said wall having means defining a circumferential channel in said inner wall whose depth along the longitudinal axis of said casing gradually varies over its circumference and becomes larger from a point of minimal thickness to a point of maximal thickness 180° from the point of minimal thickness
   b. a capacitor section and electrolyte is said casing; and
   c. a resilient disc seal, for hermetically sealing said open end, compressibly supported in said channel such that excess gas pressure will be vented by tipping the seal out of the channel at the shallowest point.

2. The capacitor of claim 1 wherein said means is a shoulder extending around the inside perimeter of the casing and a rib spaced from said shoulder.

3. The capacitor of claim 2 wherein said rib is continuous and extends around the inner perimeter of said inner wall.

4. The capacitor of claim 2 wherein said casing is cylindrical, said opening being in one end of said cylindrical casing, and said rib being spaced longitudinally and outwardly of said shoulder.

5. The capacitor of claim 2 wherein said rib comprises a plurality of segments spaced around the inner perimeter of said inner wall, and said rib segments and said shoulder subdividing said channel into channel sections.

* * * * *